United States Patent
Kimura

(10) Patent No.: US 9,451,557 B2
(45) Date of Patent: Sep. 20, 2016

(54) BASE STATION, COMMUNICATION SYSTEM, AND COMMUNICATION METHOD

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 13/732,643

(22) Filed: Jan. 2, 2013

(65) Prior Publication Data

US 2013/0190034 A1    Jul. 25, 2013

(30) Foreign Application Priority Data

Jan. 25, 2012   (JP) .................................. 2012-013521

(51) Int. Cl.
*H04W 52/24* (2009.01)
*H04W 52/44* (2009.01)

(52) U.S. Cl.
CPC ......... *H04W 52/243* (2013.01); *H04W 52/244* (2013.01); *H04W 52/44* (2013.01); *Y02B 60/50* (2013.01)

(58) Field of Classification Search
CPC ............. H04W 52/20; H04W 52/241; H04W 52/243; H04W 52/244; H04W 52/44
See application file for complete search history.

(56) References Cited

U.S. PATENT DOCUMENTS

| | | | |
|---|---|---|---|
| 6,760,580 B2 * | 7/2004 | Robinson ................ | H04L 51/04 455/412.2 |
| 8,538,337 B2 * | 9/2013 | Damnjanovic ..... | H04W 52/244 455/444 |
| 2003/0093327 A1 * | 5/2003 | Roberts .................. | G06Q 10/02 705/26.8 |
| 2003/0229900 A1 * | 12/2003 | Reisman ........... | G06F 17/30873 725/87 |
| 2004/0083291 A1 * | 4/2004 | Pessi ..................... | H04L 65/605 709/227 |
| 2004/0141594 A1 * | 7/2004 | Brunson ................. | H04L 12/58 379/88.12 |
| 2005/0033852 A1 * | 2/2005 | Tenhunen ............ | G06Q 10/107 709/229 |
| 2005/0114493 A1 * | 5/2005 | Mandato ............... | H04L 67/327 709/223 |
| 2005/0169446 A1 * | 8/2005 | Randall ................. | H04M 1/576 379/93.23 |
| 2005/0277406 A1 * | 12/2005 | Diroo ................ | H04M 3/42042 455/412.2 |
| 2005/0277431 A1 * | 12/2005 | White ..................... | H04W 8/04 455/466 |
| 2006/0007899 A1 * | 1/2006 | White ............... | H04M 3/42042 370/338 |
| 2008/0096580 A1 * | 4/2008 | Montemurro .......... | H04L 12/66 455/456.1 |
| 2009/0180448 A1 * | 7/2009 | Kobayashi ........... | H04W 40/08 370/338 |

(Continued)

FOREIGN PATENT DOCUMENTS

| | | |
|---|---|---|
| JP | 2010-004187 A | 1/2010 |
| JP | 2010-283826 A | 12/2010 |

*Primary Examiner* — Bobbak Safaipour
(74) *Attorney, Agent, or Firm* — Arent Fox LLP

(57) ABSTRACT

A base station including: a transmitter configured to transmit a first radio signal to a first mobile station, a receiver configured to receive a second radio signal, a processor configured to detect a second mobile station communicates with a communication device differing from the base station, based on a third radio signal from the second mobile station which is contained in the second radio signal, the first radio signal interfering with a radio communication between the second mobile station and the communication device, and to decrease transmission power of the first radio signal, on detecting the second mobile station or failing to detect the second mobile station over a first given period or longer.

19 Claims, 12 Drawing Sheets

(56) References Cited

U.S. PATENT DOCUMENTS

| | | | |
|---|---|---|---|
| 2009/0318182 A1 | 12/2009 | Nagato et al. | |
| 2010/0311449 A1* | 12/2010 | Whinnett | H04W 72/0473 455/501 |
| 2011/0124366 A1* | 5/2011 | Hosono | H04W 24/10 455/522 |
| 2012/0257598 A1* | 10/2012 | Karampatsis | H04W 8/082 370/331 |
| 2013/0028295 A1* | 1/2013 | Hui | H04B 1/713 375/135 |
| 2013/0184876 A1* | 7/2013 | Roshen | G06F 1/3231 700/277 |
| 2014/0043247 A1* | 2/2014 | Singh | G06F 1/3218 345/173 |
| 2014/0194058 A1* | 7/2014 | Lee | A61N 1/3787 455/41.1 |

* cited by examiner

BASE STATION, COMMUNICATION SYSTEM, AND COMMUNICATION METHOD

CROSS-REFERENCE TO RELATED APPLICATION

This application is based upon and claims the benefit of priority of the prior Japanese Patent Application No. 2012-013521, filed on Jan. 25, 2012, the entire contents of which are incorporated herein by reference.

FIELD

The embodiments discussed herein are related to a base station, a communication system, and a communication method.

BACKGROUND

Services are provided in which a femto base station (HeNB (Home eNode B)) creates a femtocell and only contract users are permitted to connect to the femto base station. In such services, there are cases where the femtocell is created within a macro cell created by a macro base station (MeNB (Macro evolutional Node B)).

In the case where a macro UE (MUE (Macro User Equipment)) that is not permitted to connect to a femto base station is present within the femtocell, the SINR (signal to interference and noise ratio) of the macro UE may be deteriorated due to the interference from the femto base station.

Such a macro UE is referred to as a "victim UE", for example. On the other hand, 3GPP (Third Generation Partnership Project) has studied a method of reducing the interference by decreasing the transmission power of a femto base station, for the purpose of improving the SINR of a victim UE. Specifically, assuming that a femto base station receives a signal transmitted from a macro base station and this received signal is low in level, the received power of the victim UE is considered to be also low. Therefore, the transmission power of the femto base station is decreased.

Meanwhile, if the transmission power of the femto base station is decreased when a victim UE is not present, the communication throughput within the femtocell may decrease unnecessarily. In consideration of this situation, a method has been studied of detecting a victim UE and determining whether to decrease the transmission power of a femto base station (for example, refer to Japanese Laid-open Patent Publication No. 2010-283826 and No. 2010-4187). Specifically, the femto base station receives an uplink signal which a victim UE would transmit, and determines whether a victim UE is present or not, on the basis of the received power of the uplink signal.

SUMMARY

According to an aspect of the invention, a base station includes: a transmitter configured to transmit a first radio signal to a first mobile station, a receiver configured to receive a second radio signal, a processor configured to detect a second mobile station communicates with a communication device differing from the base station, based on a third radio signal from the second mobile station which is contained in the second radio signal, the first radio signal interfering with a radio communication between the second mobile station and the communication device, and to decrease transmission power of the first radio signal, on detecting the second mobile station or failing to detect the second mobile station over a first given period or longer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a base station, a communication system, and a communication method will be described in detail with reference to the accompanying drawings.

While inventing the present embodiments, observations were made regarding a related art. Such observations include the following, for example.

In a technology of the related art, a victim UE may fail to receive a control channel (uplink signal transmission permission information, etc.) from a macro base station due to the interference from a femto base station. In this case, it may be impossible for the victim UE to transmit an uplink signal. Thus, when a victim UE is present but is not detected, the transmission power of the femto base station is not decreased. As a result, the interference with the victim UE is not reduced.

An object of the embodiments, which solves the above disadvantage, is to provide a base station, a communication system, and a communication method which are capable of reducing the interference.

First Embodiment

Figure 1:
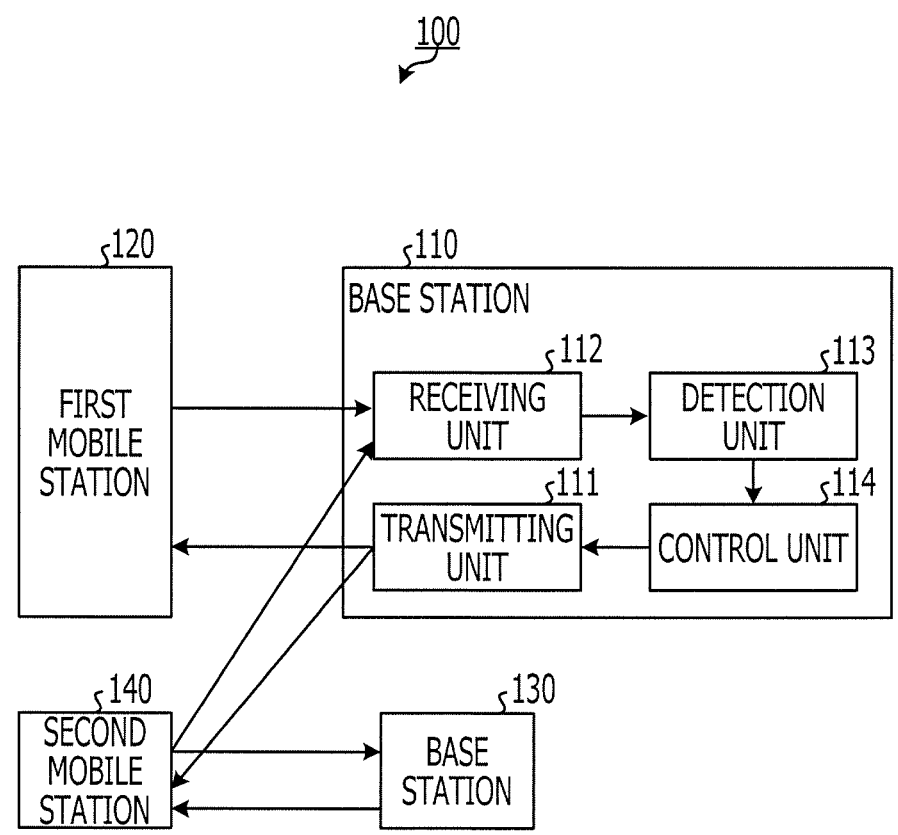
FIG. 1 is an exemplary view illustrating a configuration of a communication system.

FIG. 1 is an exemplary view illustrating a configuration of a communication system 100. The communication system 100 includes a base station 110, a first mobile station 120, a base station 130, and a second mobile station 140. The base station 110 performs radio communications with the first mobile station 120. This first mobile station 120 may include either a single or a plurality of mobile stations. The base station 130 performs radio communications with the second mobile station 140. This second mobile station 140 may include either a single or a plurality of mobile stations.

The radio communications between the second mobile station 140 and the base station 130 are interfered with by a radio signal transmitted from the base station 110 to the first mobile station 120. For example, the radio communications between the second mobile station 140 and the base station 130 use a frequency band that is the same as that of the radio communications between the base station 110 and the first mobile station 120. In addition, the second mobile station 140 is a mobile station that is unable to perform radio communications with the base station 110. Accordingly, the radio communications between the second mobile station 140 and the base station 130 are subject to the downlink interference from a radio signal transmitted from the base station 110 to the first mobile station 120.

The base station 110 includes a transmitting unit 111, a receiving unit 112, a detection unit 113, and a control unit 114. The transmitting unit 111 transmits a radio signal to the first mobile station 120. The radio signal transmitted from the transmitting unit 111 to the first mobile station 120 interferes with the radio communications between the base station 130 and the second mobile station 140.

The receiving unit 112 receives radio signals from the surroundings. Signals received by the receiving unit 112 include, for example, a signal transmitted from the first mobile station 120 to the base station 110, and signals transmitted and received between the base station 130 and the second mobile station 140. The receiving unit 112 outputs the received signal to the detection unit 113.

The detection unit 113 detects the second mobile station 140, on the basis of a radio signal from the second mobile station 140 which is contained in the signal outputted from the receiving unit 112. For example, the detection unit 113 measures the received power of the radio signal received from the second mobile station 140 by measuring the interference power of the uplink radio signal contained in the signal outputted from the receiving unit 112. Then, the detection unit 113 detects the second mobile station 140, on the basis of the measurement result. Specifically, the detection unit 113 consecutively measures pieces of the interference power for multiple times and, then detects the second mobile station 140, on the basis of how many times the pieces of resultant powers exceed a given threshold. The detection unit 113 outputs the detection result to the control unit 114.

The control unit 114 controls the transmission power of a radio signal from the transmitting unit 111, on the basis of the detection result outputted from the detection unit 113. To be specific, the control unit 114 decreases the transmission power of a radio signal from the transmitting unit 111, when the detection unit 113 detects the second mobile station 140 or when the detection unit 113 has failed to detect the second mobile station 140 over a given period or longer. In this case, the control unit 114 may decrease the transmission power of the radio signal to zero, or shut down the transmission of the radio signal.

The control unit 114 makes the transition among, for example, a first state, a second state, and a third state. In the first state, the control unit 114 causes the transmitting unit 111 to transmit a radio signal to the first mobile station 120 at first transmission power. In the second state, the control unit 114 causes the transmitting unit 111 to transmit a radio signal to the first mobile station 120 at second transmission power that is lower than the first transmission power.

In the third state, the control unit 114 causes the transmitting unit 111 to pause to transmit at least a data signal out of radio signals to be transmitted to the first mobile station 120. In the third state, for example, the control unit 114 stops allocating radio resources to the first mobile station 120 or scheduling the radio resources therein. This makes it possible to pause to transmit a data signal to the first mobile station 120 under simple control, for example, without giving any notification to the first mobile station 120. The radio resources may include a time resource and a frequency resource.

In the first state where the transmission power is relatively high, when the second mobile station 140 is detected, the control unit 114 makes the transition to the second state. Through this transition, the transmission power of the base station 110 is decreased, and therefore, the interference with the radio communications is reduced between the second mobile station 140 and the base station 130. This reduction in the interference with the second mobile station 140 improves the throughput of the second mobile station 140.

Meanwhile, in the first state where the transmission power is relatively high, when the second mobile station 140 has not been detected over a given period or longer, the control unit 114 makes the transition to the third state. Through this transition, the transmission power of the base station 110 is decreased. Accordingly, it becomes possible for the second mobile station 140 to receive, for example, a control signal, such as uplink signal transmission permission information, from the base station 130 and to transmit a radio signal to the base station 130 more readily. Thus, the detection of the second mobile station 140 which is based on a radio signal from the second mobile station 140 is made more precisely.

In the third state where the second mobile station 140 would be detected readily, when the second mobile station 140 is detected, the control unit 114 makes the transition to the second state. Through this transition, the transmission power of the base station 110 decreases, and therefore, the interference with the radio communications is reduced between the base station 130 and the second mobile station 140. Thus, by keeping the control unit 114 from staying in the third state for a long time, the decrease in the throughput of the radio communications is avoided between the base station 110 and the first mobile station 120.

Meanwhile, in the third state where the second mobile station 140 would be detected readily, when the second mobile station 140 is not detected, the control unit 114 makes the transition to the first state. With this transition, the control unit 114 is kept from staying in the third state for a long time despite the absence of the second mobile station 140, thereby avoiding the reduction in the throughput of the radio communications between the base station 110 and the first mobile station 120.

In the second state where the transmission power of the radio signal from the base station 110 is relatively low, when the second mobile station 140 has not been detected over a given period or longer, the control unit 114 makes the transition to the first state. With this transition, the control unit 114 is kept from staying in the second state for a long time despite the absence of the second mobile station 140, thereby avoiding the reduction in the throughput of the radio communications between the base station 110 and the first mobile station 120.

In the third state, the control unit 114 may allow the transmitting unit 111 to transmit radio signals other than data signals to the first mobile station 120. Radio signals other than data signals may include, for example, a reference signal, a control channel, and a common channel. The radio signals other than data signals are allocated to fewer resources than data signals are. Accordingly, the radio signals are transmitted at low transmission power. Thus, even if the radio signals other than data signals are transmitted, they do not greatly interfere with the radio communications between the base station 130 and the second mobile station 140.

In the third state, the control unit 114 may allow the transmitting unit 111 to transmit data signals to the first mobile station 120 intermittently. In other words, in the third state, the control unit 114 may allow the transmitting unit 111 to pause to transmit data signals to the first mobile station 120 intermittently. In this case, it is desirable for the second mobile station 140 to receive a control signal from the base station 130 and to transmit a radio signal to the base station 130 while the base station 110 is pausing to output a data signal.

The above description has been given regarding the case where the second mobile station 140 performs radio communications with the base station 130. However, it is to be noted that the communication partner of the second mobile station 140 may be any other communication device than the base station 130. For example, the communication partner of the second mobile station 140 may be a mobile station other than the first mobile station 120. In this case, it is preferable that the ad-hoc communications be performed between the second mobile station 140 and the mobile station, and the base station 130 be excluded from the communication system 100.

The above description has been given regarding the case where the control unit 114 makes the transition among the first state, the second state, and the third state. However, it is to be noted that the control unit 114 may make the transition between the first state and the second state. For example, when the second mobile station 140 has not been detected over a given period or longer in the first state, the control unit 114 may make the transition to the second state. Through this transition, the transmission power of the base station 110 is decreased, and therefore, the second mobile station 140 receives, for example, a control signal, such as uplink signal transmission permission information, from the base station 130 and transmits a radio signal to the base station 130 more readily, similar to the transition to the three states.

(Hardware Configuration of Base Station)

Figure 2:
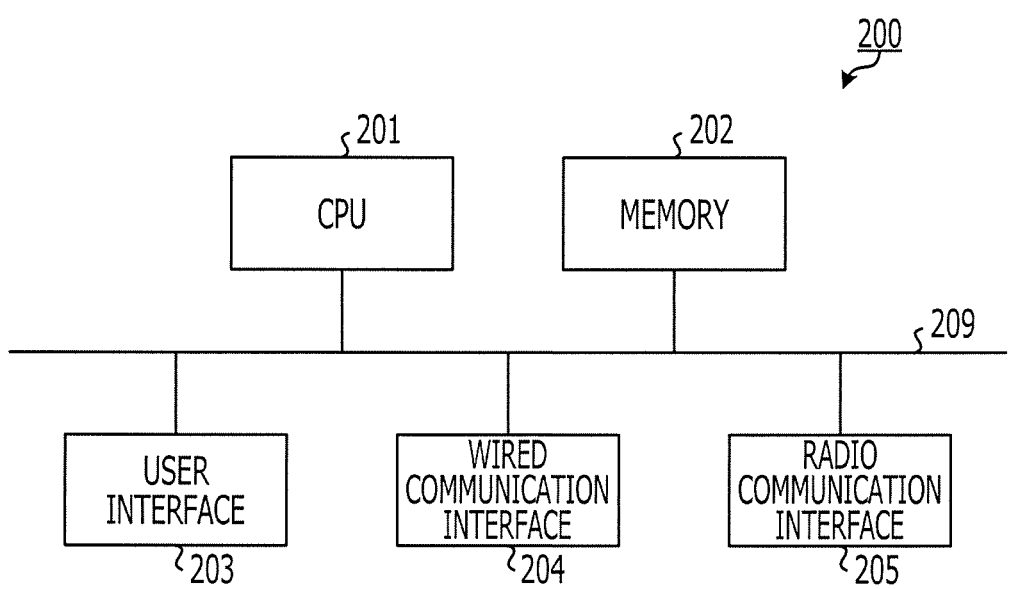
FIG. 2 is an exemplary view illustrating a hardware configuration of a base station.

FIG. 2 is an exemplary view illustrating a hardware configuration of the base station 110. The base station 110 illustrated in FIG. 1 may be implemented by, for example, an information processing device 200 illustrated in FIG. 2. The information processing device 200 includes a CPU 201, a memory 202, a user interface 203, a wired communication interface 204, and a radio communication interface. The CPU 201, the memory 202, the user interface 203, the wired communication interface 204, and the radio communication interface 205 are interconnected via a bus 209.

The CPU (central processing unit) 201 has a control over the overall information processing device 200. The memory 202 includes, for example, a main memory and an auxiliary memory. The main memory is, for example, a RAM (random access memory), and is used as a working area of the CPU 201. The auxiliary memory is, for example, a nonvolatile memory, such as a hard disk, an optical disc, a flash memory, and the like, and stores various programs for operating the information processing device 200. The programs stored in the auxiliary memory are loaded into the main memory, and executed by the CPU 201.

The user interface 203 includes, for example, an input device for receiving an input operation from a user, and an output device for outputting information to the user. The input device is implemented by, for example, keys such as those of a keyboard, a remote controller, or the like, and the output device is implemented by, for example, a display, speakers, or the like. Alternatively, both devices may be implemented by a touch panel or some other suitable panel. The user interface 203 is controlled by the CPU 201.

The wired communication interface 204 performs wired communicates with external devices, for example, via a core network. The radio communication interface 205 performs radio communications with external devices such as the first mobile station 120. Both the wired communication interface 204 and the radio communication interface 205 are controlled by the CPU 201.

Both the transmitting unit 111 and the receiving unit 112 illustrated in FIG. 1 is implemented by, for example, the radio communication interface 205. Both the detection unit 113 and the control unit 114 illustrated in FIG. 1 is implemented by, for example, the CPU 201.

(Application Example of Communication System)

Figure 3:
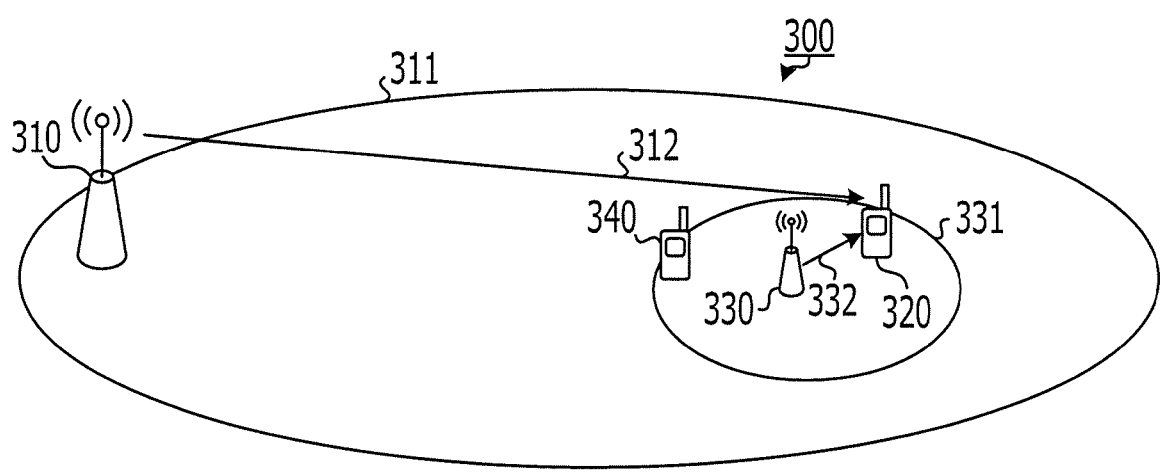
FIG. 3 is an exemplary view illustrating an application of the communication system.

FIG. 3 is an exemplary view illustrating an application of a communication system 300. The communication system 300 illustrated in FIG. 3 is realized by applying the communication system 100 illustrated in FIG. 1 to a communication system confronting LTE (Long Term Evolution). However, the communication system 100 illustrated in FIG. 1 may be applied to a system confronting not only LTE but also some other radio communication scheme.

The communication system 300 includes a macro base station 310, a macro UE 320, a femto base station 330, and a femto UE 340. A macro cell 311 is the cell, or the coverage, of the macro base station 310, and a femtocell 331 is the cell of the femto base station 330. For example, the femto base station 330 is configured to perform radio communications with the registered femto UE 340 (specifically, the user of the femto UT 340 has the contract), but not to perform radio communications with the non-registered macro UE 320.

The macro UE 320 is placed within the macro cell 311, and performs radio communications with the macro base station 310. In addition, the macro UE 320 is also placed within the femtocell 331, but is not unable to perform with radio communications with the femto base station 330. Accordingly, the macro UE 320 becomes a victim UE, which is subject to interference 332 from the femto base station 330 upon receiving a signal 312 from the macro base station 310.

For example, the base station 110 and the first mobile station 120 illustrated in FIG. 1 may be applied to the femto base station 330 and the femto UE 340, respectively. In addition, the base station 130 and the second mobile station 140 illustrated in FIG. 1 may be applied to the macro base station 310 and the macro UE 320, respectively.

(Frame Format of Downlink Signal)

Figure 4:
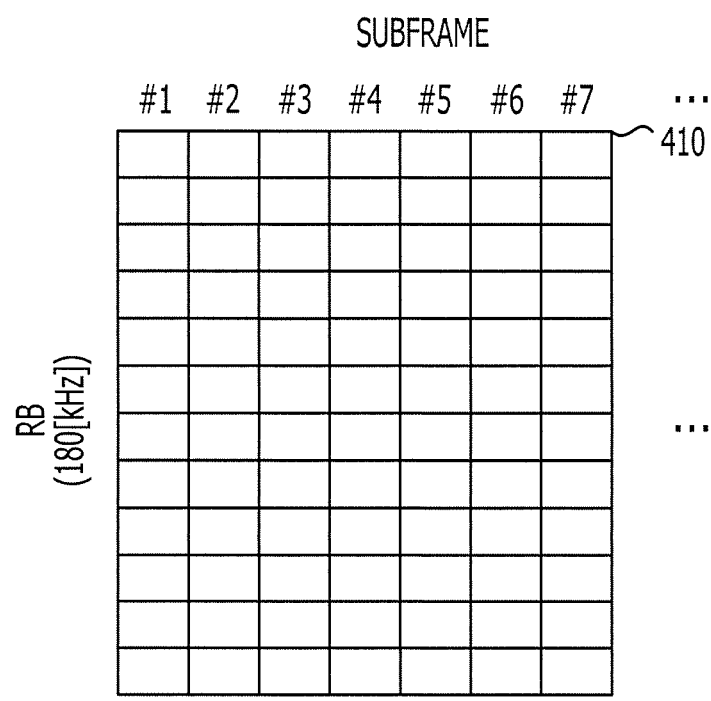
FIG. 4 is an exemplary view illustrating a frame format of a downlink signal.

FIG. 4 is an exemplary view illustrating a frame format of a downlink signal. A frame format 410 illustrated in FIG. 4 is a frame format of a downlink signal transmitted from the femto base station 330 to the femto UE 340. Here, a frame format of a downlink signal based on LTE will be described as an example.

In the frame format 410, a lateral direction represents a subframe, and a vertical direction represents a resource block RB. The subframe is a time resource, and the resource block is a frequency resource. The downlink signal is transmitted in units of the resource block and the subframe, as in the frame format 410. Each of subframes #1 to #7 on the lateral axis is a subframe of 1 ms, and each of resource blocks on the vertical axis is a subcarrier formed, for example, by dividing a frequency band of 180 kHz into twelve frequency bands.

Figure 5:
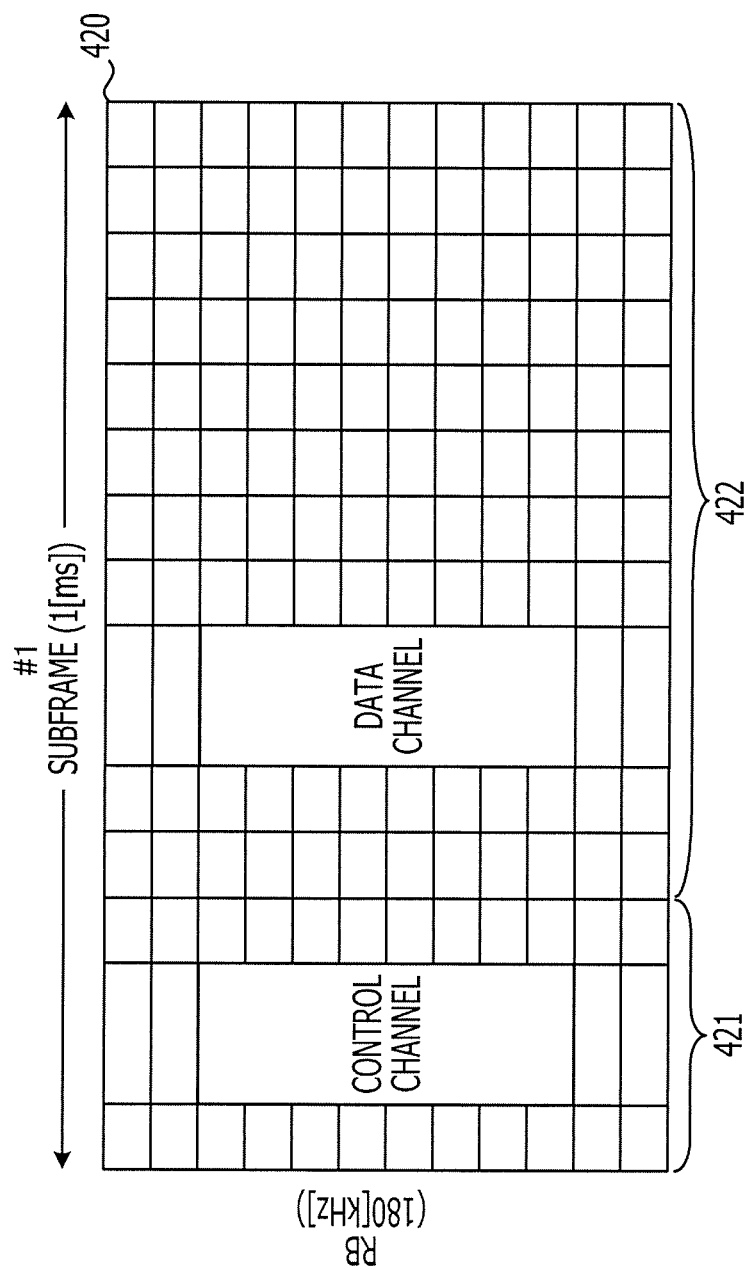
FIG. 5 is an exemplary view illustrating a frame format in a subframe.

FIG. 5 is an exemplary view illustrating a frame format in a subframe. A frame format 420 illustrated in FIG. 5 corresponds to a frame format of the subframe #1 illustrated in FIG. 4. It is to be noted that this frame format is also applicable to that of each of the subframes #2 to #7 illustrated in FIG. 4.

Each of the subframes in the frame format 420 contains fourteen OFDM symbols. The first to third OFDM symbols from the head constitute a control channel 421, and the fourth to fourteenth OFDM symbols constitute a data channel 422.

The data channel 422 is, for example, a PDSCH (Physical Downlink Shared Channel). The macro UE 320 receives the control channel 421 and, then demodulates and decodes the data channel 422 on the basis of the received control channel 421.

(Configuration of Femto Base Station)

Figure 6:
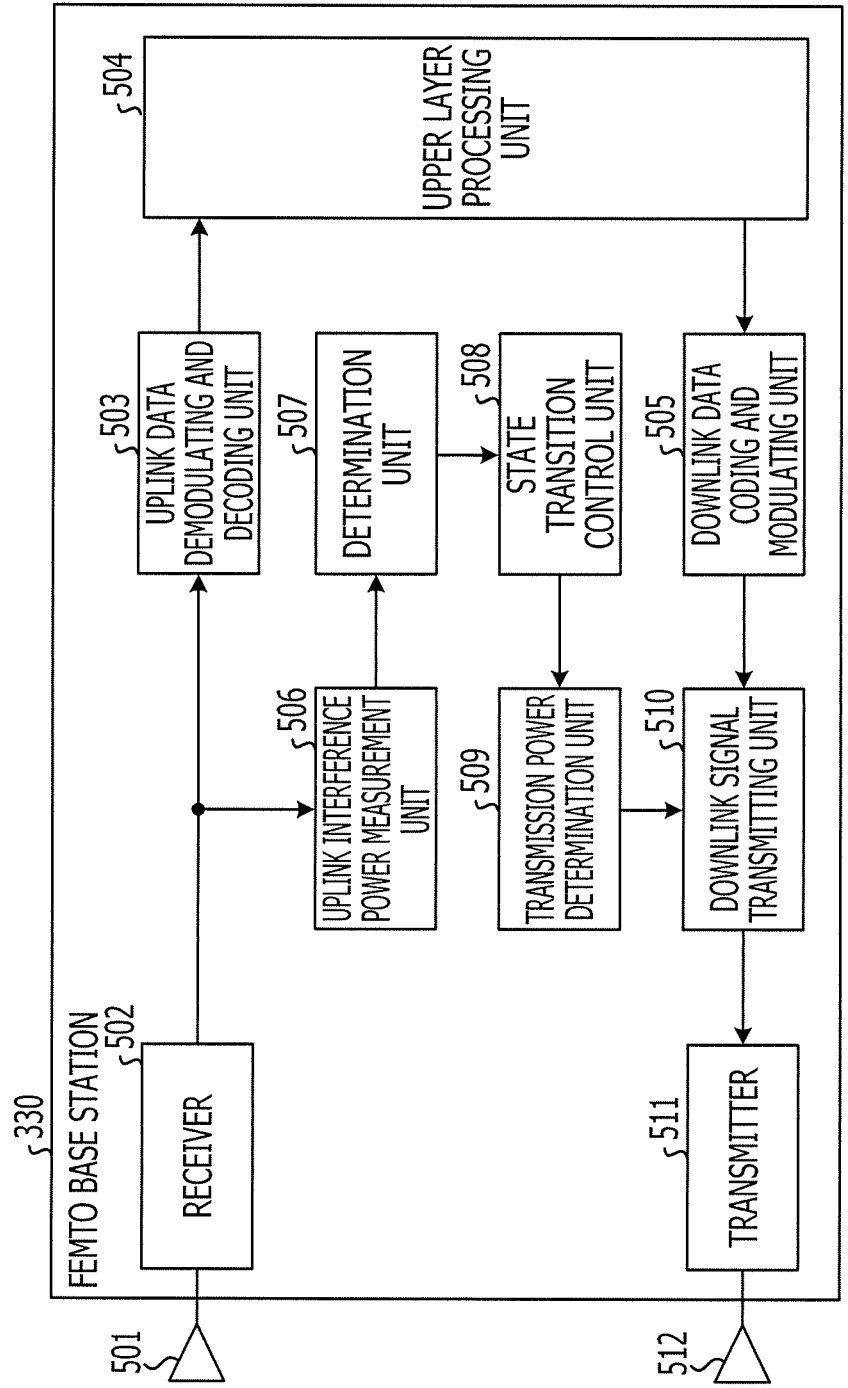
FIG. 6 is an exemplary view illustrating a configuration of a femto base station.

FIG. 6 illustrates an exemplary configuration of a femto base station 330. As illustrated in FIG. 6, the femto base station 330 includes, for example, a receiving antenna 501, a receiver 502, an uplink data demodulating and decoding unit 503, an upper layer processing unit 504, a downlink data coding and modulating unit 505, an uplink interference power measurement unit 506, a determination unit 507, a state transition control unit 508, a transmission power determination unit 509, a downlink signal transmitting unit 510, a transmitter 511, and a transmitting antenna 512.

The receiving antenna 501 receives radio signals. Signals received by the receiving antenna 501 include, for example, an uplink signal from the femto UE 340 and an uplink signal from the macro UE 320. The receiving antenna 501 outputs the received signals to the receiver 502.

The receiver 502 converts the RF (radio frequency) signal outputted from the receiving antenna 501 into a BB (base band) signal. The receiver 502 outputs the converted BB signal to both the uplink data demodulating and decoding unit 503 and the uplink interference power measurement unit 506.

The uplink data demodulating and decoding unit 503 demodulates an uplink signal from the femto UE 340 which is contained in the signal outputted from the receiver 502. Then, the uplink data demodulating and decoding unit 503 decodes the demodulated signal. The uplink data demodulating and decoding unit 503 outputs uplink data from the femto UE 340, which has been acquired as a result of the decoding, to the upper layer processing unit 504.

The upper layer processing unit 504 subjects the uplink data outputted from the uplink data demodulating and decoding unit 503 to the upper layer processing. For example, the upper layer processing unit 504 transmits the uplink data to a core network. In addition, the upper layer processing unit 504 acquires downlink data for the femto UE 340 through the upper layers processing. For example, the upper layer processing unit 504 acquires the downlink data for the femto UE 340 transmitted from the core network. Then, the upper layer processing unit 504 outputs the acquired downlink data to the downlink data coding and modulating unit 505.

The downlink data coding and modulating unit 505 codes the downlink data outputted from the upper layer processing unit 504 and, then modulates the coded data. The downlink data coding and modulating unit 505 outputs a signal acquired as a result of the modulation to the downlink signal transmitting unit 510.

The uplink interference power measurement unit 506 measures interference power, namely, power of a signal which interferences with an uplink signal from the femto UE 340 and which is contained in the signal outputted from the receiver 502. For example, the uplink interference power measurement unit 506 measures the interference power on the basis of a known signal, such as a reference signal, contained in the uplink signal from the femto UE 340. In more detail, the uplink interference power measurement unit 506 may measure the interference power by subtracting a known signal component from the uplink signal outputted from the receiver 502. The uplink interference power measurement unit 506 measures the interference power for each subframe. The uplink interference power measurement unit 506 notifies the determination unit 507 of the measured interference power.

Every time receiving the interference power from the uplink interference power measurement unit 506, the determination unit 507 compares the received interference power with a given threshold. If the interference power exceeds the threshold for M1 times or more in the recent N-times comparison ("N" is a natural number), the determination unit 507 determines that a victim UE (macro UE 320) is present. Meanwhile, if the interference power exceeds the threshold for less than M2 times in the recent N-times comparison, the determination unit 507 determines that no victim UE is present.

In the above comparison, a relationship of M1=M2 or M1>M2 is satisfied. If the number of times that the interference power exceeds the threshold is less than M1 and equal to/more than M2, the determination unit 507 does not determine the presence of a victim UE and maintains the controlled state of the transmission power. The determination unit 507 notifies the state transition control unit 508 of the determination result.

The state transition control unit 508 selects any one from among a high transmission power state, a low transmission power state, and a transmission power shutdown state for a transmission state of the femto base station 330, on the basis of the determination result received from the determination unit 507. The high transmission power state, low transmission power state, and transmission power shutdown state correspond to the above first, second and third states, respectively. The state transition control unit 508 notifies the transmission power determination unit 509 of the selected transmission state.

The transmission power determination unit 509 determines transmission power of a downlink signal to be transmitted from the femto base station 330, in accordance with the transmission state received from the state transition control unit 508. For example, the transmission power determination unit 509 determines transmission power in the low transmission power state, on the basis of a propagation loss of the nearest macro base station 310. Specifically, as the propagation loss from the macro base station 310 increases, the power of a signal which the victim UE is able to receive decreases, or the victim UE is more likely to be sensitive to the interference. For this reason, when the propagation loss is great, the femto base station 330 decreases the transmission power.

Assuming that the power of a signal which the femto base station 330 has received from the macro base station 310 is denoted by P_RX, the transmission power determination unit 509 determines transmission power P_TX at which the femto base station 330 will transmit a signal, through a calculation using the following equation, $$P\_TX = \min(P\_MAX, a \times P\_RX + b)$$

where "P_MAX" denotes the maximum transmission power at which the femto base station 330 is allowed to transmit a signal, and "a" and "b" denote a constant.

When a high priority is given to the throughput of the femtocell 331, the coefficients "a" and "b" are increased in order to increase the transmission power of the femtocell 331. Meanwhile, when a high priority is given to the protection of a victim UE, the coefficients "a" and "b" are decreased in order to decrease the transmission power of the femtocell 331. The transmission power determination unit 509 notifies the downlink signal transmitting unit 510 of the determined transmission power.

The downlink signal transmitting unit 510 amplifies a signal outputted from the downlink data coding and modulating unit 505, such that the signal is equal to the transmission power received from the transmission power determination unit 509. Then, the downlink signal transmitting unit 510 outputs the amplified signal to the transmitter 511.

The transmitter 511 converts the BB signal outputted from the downlink signal transmitting unit 510 into an RF signal. The transmitter 511 outputs the converted RF signal to the transmitting antenna 512. The transmitting antenna 512 outputs the radio signal outputted from the transmitter 511.

The transmitting unit 111 illustrated in FIG. 1 may be implemented by, for example, a combination of the transmitter 511 and the transmitting antenna 512. The receiving unit 112 illustrated in FIG. 1 may be implemented by, for example, a combination of the receiving antenna 501 and the receiver 502. The detection unit 113 illustrated in FIG. 1 may be implemented by, for example, a combination of the uplink interference power measurement unit 506 and the determination unit 507. The control unit 114 illustrated in FIG. 1 may be implemented by, for example, a combination of the state transition control unit 508, the transmission power determination unit 509, and the downlink signal transmitting unit 510.

(State Transition of Femto Base Station)

Figure 7:
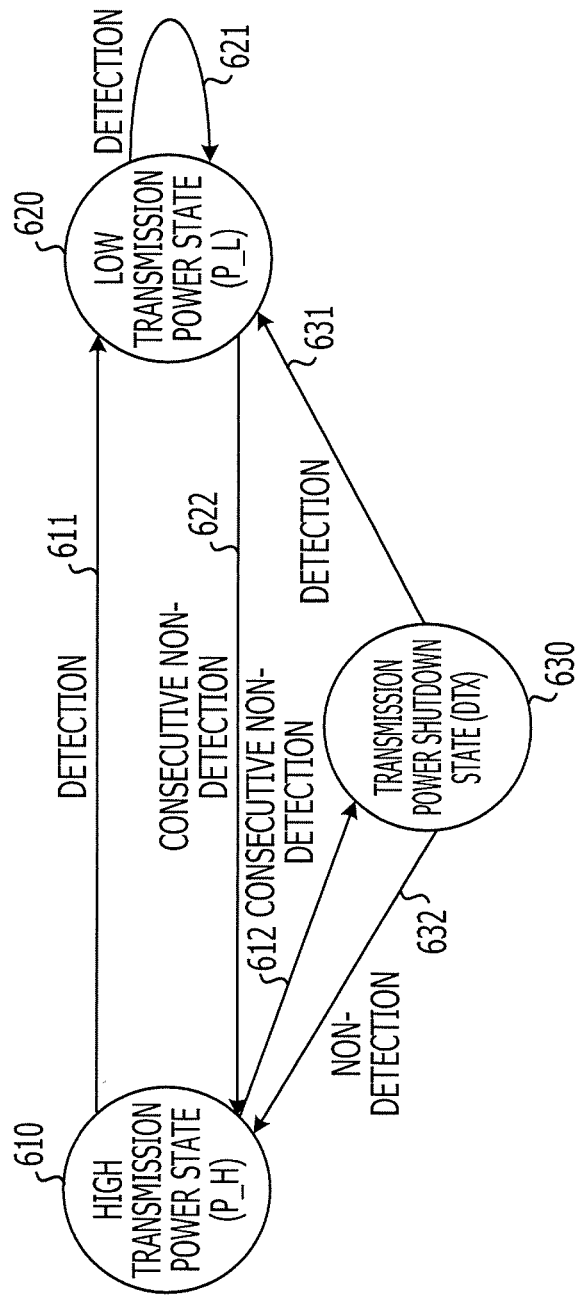
FIG. 7 is an exemplary state transition dialogue of the femto base station.

FIG. 7 is an exemplary state transition dialogue of the femto base station 330. As illustrated in FIG. 7, the femto base station 330 makes the transition among a high transmission power state 610, a low transmission power state 620, and a transmission power shutdown state 630. The transmission power of the femto base station 330 in the high transmission power state 610 is denoted by P_H, and the transmission power of the femto base station 330 in the low transmission power state 620 is denoted by P_L. In an initial operation, the femto base station 330 enters, for example, the high transmission power state 610.

(Operation of Femto Base Station in High Transmitted Power State)

When the femto base station 330 in the high transmission power state 610 detects a victim UE, the femto base station 330 makes the transition to the low transmission power state 620 promptly, as indicated by an arrow 611. As a result, the interference with the detected victim UE is reduced. Otherwise, when the femto base station 330 in the high transmission power state 610 consecutively fails to detect a victim UE for given times or more (referred to as "consecutive non-detection"), the femto base station 330 makes the transition to the transmission power shutdown state 630, as indicated by an arrow 612. This is because it is considered that since failing to receive a control channel, a victim UE does not transmit an uplink signal. This transition to the transmission power shutdown state 630 makes the detection of the victim UE more readily.

As described above, the femto base station 330 in the high transmission power state 610 repeats the detection of a victim UE, and if consecutively failing to detect a victim UE for given times, the femto base station 330 makes the transition to the transmission power shutdown state 630, in order to decrease the transmission power thereof.

(Operation of Femto Base Station in Low Transmission Power State)

When the femto base station 330 in the low transmission power state 620 detects the victim UE, the femto base station 330 maintains this low transmission power state 620, as indicated by an arrow 621. As a result, the interference with the detected victim UE is reduced. Otherwise, when the femto base station 330 in the low transmission power state 620 consecutively fails to detect the victim UE for given times or more, namely, when the consecutive non-detection occurs, the femto base station 330 makes the transition to the high transmission power state 610, as indicated by an arrow 622. This is because it is considered that the victim UE is no longer present.

(Operation of Femto Base Station in Transmitted Power Shutdown State)

When the femto base station 330 in the transmission power shutdown state 630 detects a victim UE, the femto base station 330 makes the transition to the low transmission power state 620 promptly, as indicated by an arrow 631. This transition reduces the interference with the detected victim UE and to suppress the decrease in the throughput of the femto base station 330 which is caused by maintaining the transmission power shutdown state 630 for a long time.

Otherwise, when the femto base station 330 in the transmission power shutdown state 630 fails to detect a victim UE, the femto base station 330 makes the transition to the high transmission power state 610 promptly, as indicated by an arrow 632. This is because it is considered that no victim UE is present. This transition suppresses the decrease in the throughput of the femto base station 330 which is caused by maintaining the transmission power shutdown state 630 for a long time.

(Operation of Femto Base Station)

Figure 8:
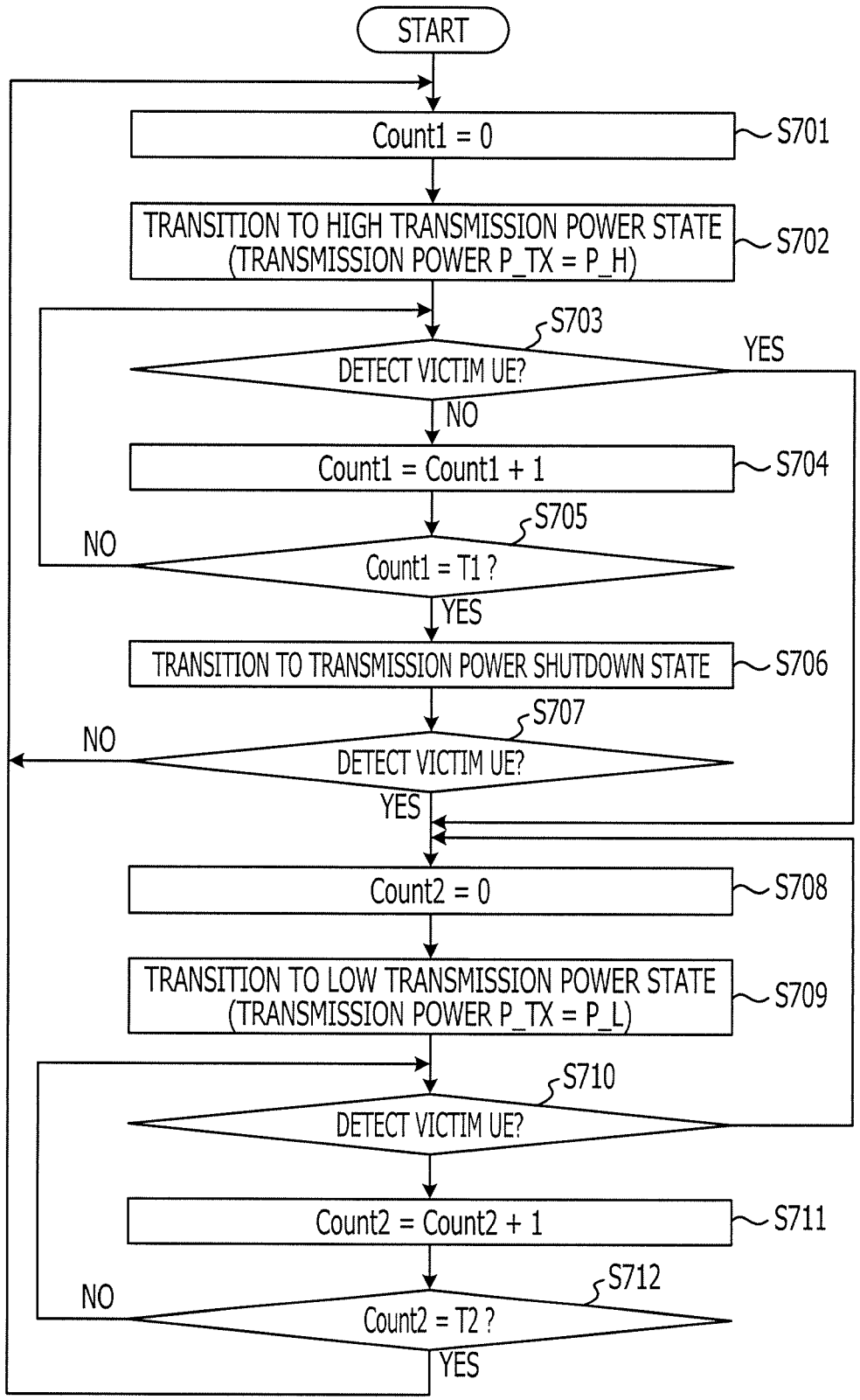
FIG. 8 is a flowchart of an exemplary operation of the femto base station.

FIG. 8 is a flowchart of an exemplary operation of the femto base station 330. The femto base station 330 makes the state transitions as illustrated in FIG. 7 by performing, for example, steps described below. In FIG. 8, a count value Count 1 indicates the number of times that the femto base station 330 consecutively fails to detect a victim UE in the high transmission power state 610, and a count value Count 2 indicates the number of times that the femto base station 330 consecutively fails to detect a victim UE in the low transmission power state 620.

At Step S701, first, the femto base station 330 sets the count value Count 1 to 0. At Step S702, the femto base station 330 enters the high transmission power state 610. In other words, the femto base station 330 sets the transmission power P_TX to P_H. At Step S703, the femto base station 330 determines whether to have detected a victim UE. In more detail, the femto base station 330 determines whether to have detected a victim UE, on the basis of how many times the interference power exceeds a threshold in recent N-times comparison.

If a victim UE has been detected at Step S703 ("Yes" at Step S703), the process proceeds to Step S708 and the femto base station 330 makes the transition to the low transmission power state 620. Otherwise, if a victim UE has not been detected at Step S703 ("No" at Step S703), the femto base station 330 increments the count value Count 1 by one at Step S704.

At Step S705, the femto base station 330 determines whether or not the count value Count 1 has reached a given value T1. In other words, the femto base station 330 determines whether to have consecutively failed to detect a victim UE for T1 times in the high transmission power state 610.

If the count value Count 1 has not reached the given value T1 at Step S705 ("No" at Step S705), the process returns to Step S703. Otherwise, if the count value Count 1 has reached the given value T1 at Step S705 ("Yes" at Step S705), the femto base station 330 makes the transition to the transmission power shutdown state 630 at Step S706.

At Step S707, the femto base station 330 determines whether to have detected a victim UE in the transmission power shutdown state 630 to which the femto base station 330 has made the transition at Step S706. If a victim UE has not been detected in the transmission power shutdown state 630 ("No" at Step S707), the femto base station 330 determines that no actual victim UE is present. In this case, the process returns to Step S701, and the femto base station 330 makes the transition to the high transmission power state 610.

If a victim UE has been detected at Step S707 ("Yes" at Step S707), the femto base station 330 sets the count value Count 2 to 0 at Step S708. At Step S709, the femto base station 330 makes the transition to the low transmission power state 620. In other words, the femto base station 330 sets the transmission power P_TX to P_L.

At Step S710, the femto base station 330 determines whether to have detected the victim UE. If the victim UE has been detected ("Yes" at Step S710), the process returns to Step S708. Otherwise, if the victim UE has not been detected ("No" at Step S710), the femto base station 330 increments the count value Count 2 by one at Step S711.

At Step S712, the femto base station 330 determines that the count value Count 2 has reached a given value T2. In other words, the femto base station 330 determines whether to have consecutively failed to detect the victim UE for T2 times in the low transmission power state 620. If the count value Count 2 has not reached the given value T2 ("No" at Step S712), the process returns to Step S710.

Otherwise, if the count value Count 2 has reached the given value T2 ("Yes" at Step S712), the process returns to Step S701, and the femto base station 330 makes the transition to the high transmission power state 610.

As described above, the base station 110 according to the first embodiment is configured to decrease the transmission power thereof when detecting the second mobile station 140, and in turn, to temporally decrease the transmission power when failing to detect the second mobile station 140 for a long time. This configuration makes it possible to detect the second mobile station 140 more readily, and to improve the throughput of the second mobile station 140.

Second Embodiment

A second embodiment will be described by focusing on different part from the first embodiment.

(State Transition of Femto Base Station)

Figure 9:
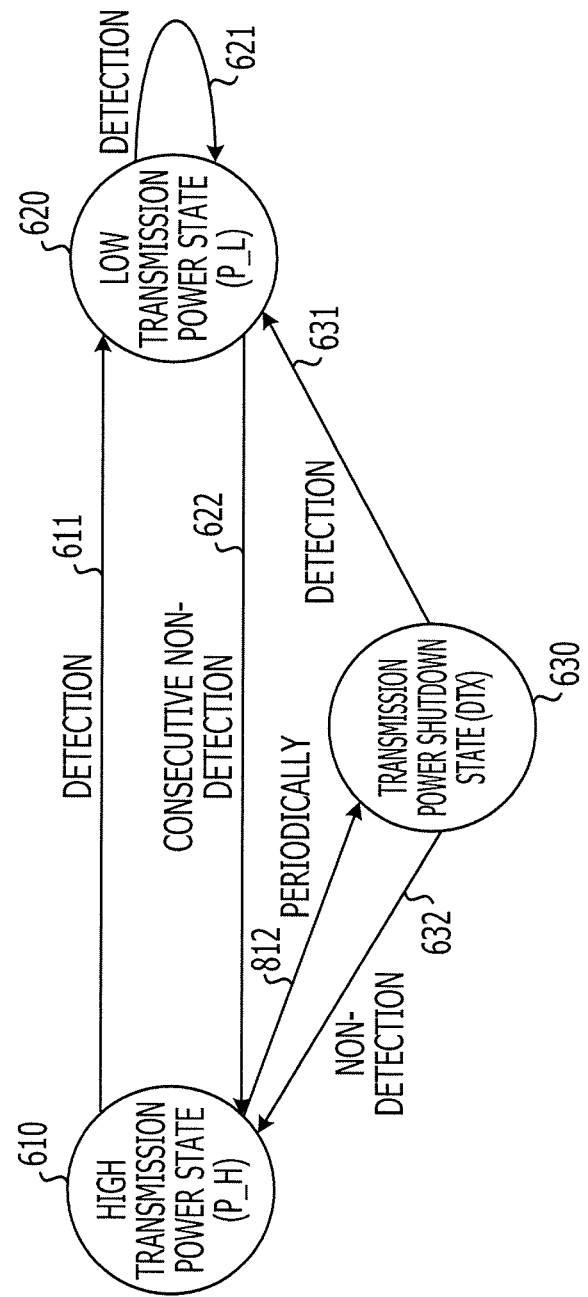
FIG. 9 is another exemplary state transition dialogue of the femto base station.

FIG. 9 is another exemplary state transition dialogue of the femto base station 330. It is to be noted that in FIG. 9, portions corresponding to those in FIG. 7 are given the same reference numerals, and a detailed description thereof will be omitted. The femto base station 330 according to the second embodiment is configured to periodically make the transition from the high transmission power state 610 to the transmission power shutdown state 630, as indicated by an arrow 812 in FIG. 9.

For example, an interval between timings at which the femto base station 330 makes the transition from the high transmission power state 610 to the transmission power shutdown state 630 is set to be coprime to a period during which the macro UE 320 will perform communications. This setting increases a possibility that the macro UE 320 is amid the communications at the time the femto base station 330 makes the transition to the transmission power shutdown state 630, thereby making the detection of the macro UE 320 more readily.

As described above, the femto base station 330 controls the transmission power to be decreased at regular timings by making the transition to the transmission power shutdown state 630. The interval between timings at which the femto base station 330 makes the transition to the transmission power shutdown state 630 is set to be coprime to the period during which the macro UE 320 performs radio communications. The period of the radio communications of the macro UE 320 may be stored in a memory of the femto base station 330 in advance.

(Operation of Femto Base Station)

Figure 10:
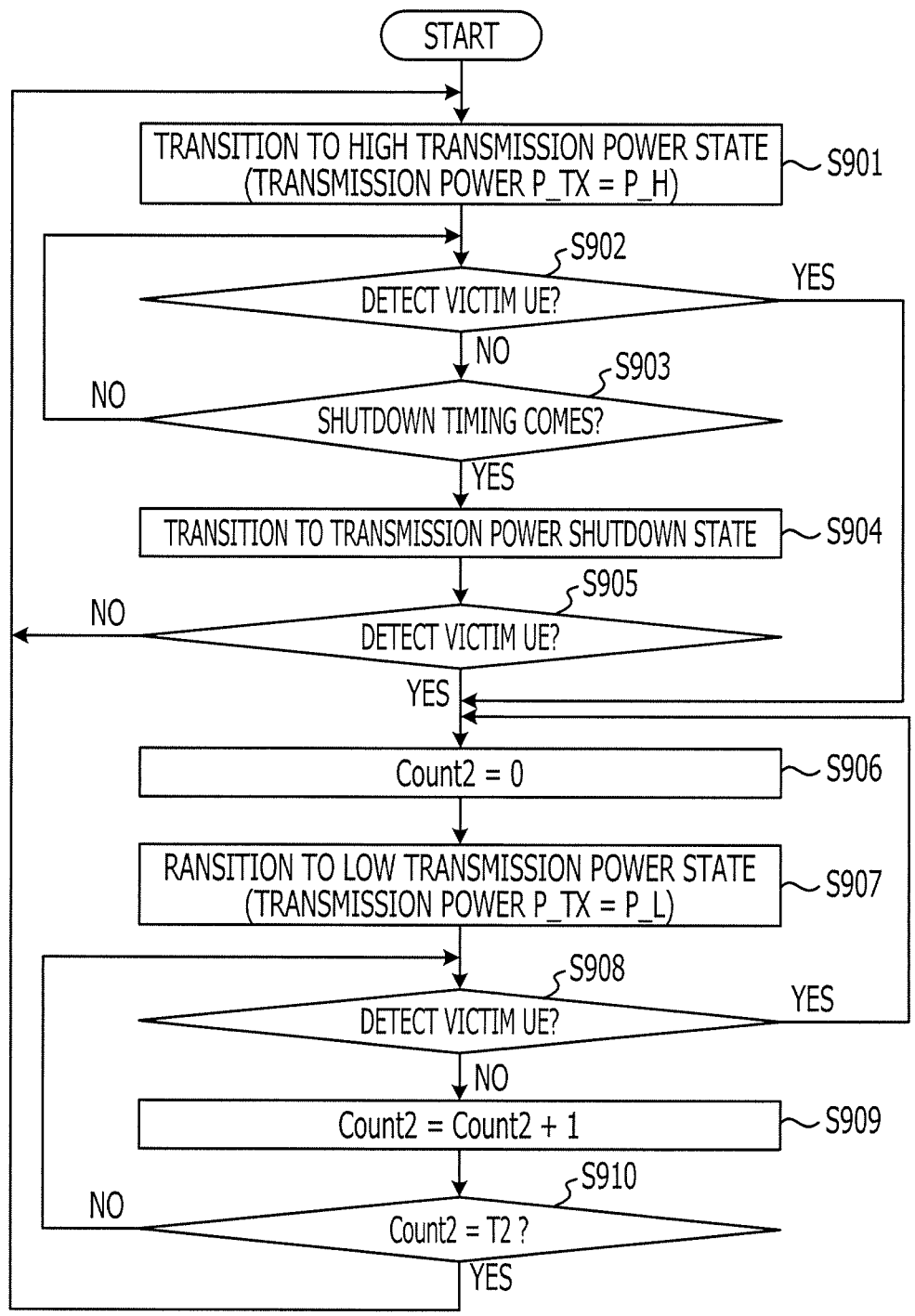
FIG. 10 is a flowchart of another exemplary operation of the femto base station.

FIG. 10 is a flowchart of another exemplary operation of the femto base station 330. The femto base station 330 according to the second embodiment makes the state transition as illustrated in FIG. 9 by performing, for example, steps described below. At Step S901, first, the femto base station 330 enters the high transmission power state 610. In other words, the femto base station 330 sets the transmission power P_TX to P_H. At Step S902, the femto base station 330 determines whether to have detected a victim UE.

If a victim UE has been detected at Step S902 ("Yes" at Step S902), the process proceeds to Step S906 and the femto base station 330 makes the transition to the low transmission power state 620. Otherwise, if a victim UE has not been detected ("No" at Step S902), the femto base station 330 determines whether or not a shutdown timing has come at Step S903. The shutdown timing is set to a given timing that has elapsed since the femto base station 330 has made the transition to the high transmission power state 610 at Step S901. This given time is set to, for example, be coprime to a period during which the macro UE 320 will perform radio communications.

At Step S903, if the shutdown timing has not come ("No" at Step S903), the process returns to Step S902. Otherwise, if the shutdown timing has come ("Yes" at Step S903), the process proceeds to Step S904. Steps S904 to S910 in FIG. 10 are the same as Steps S706 to S712 in FIG. 8, respectively. Through Steps S901 to S910, the femto base station 330 periodically makes the transition to the transmission power shutdown state 630 while pausing to detect the victim UE.

As described above, the base station 110 according to the second embodiment is configured to periodically decrease the transmission power when not detecting the second mobile station 140. This configuration makes it possible to produce the same effect as the base station 110 according to first embodiment does.

Third Embodiment

A third embodiment will be described by focusing on different part from the first embodiment.

(State Transition of Femto Base Station)

Figure 11:
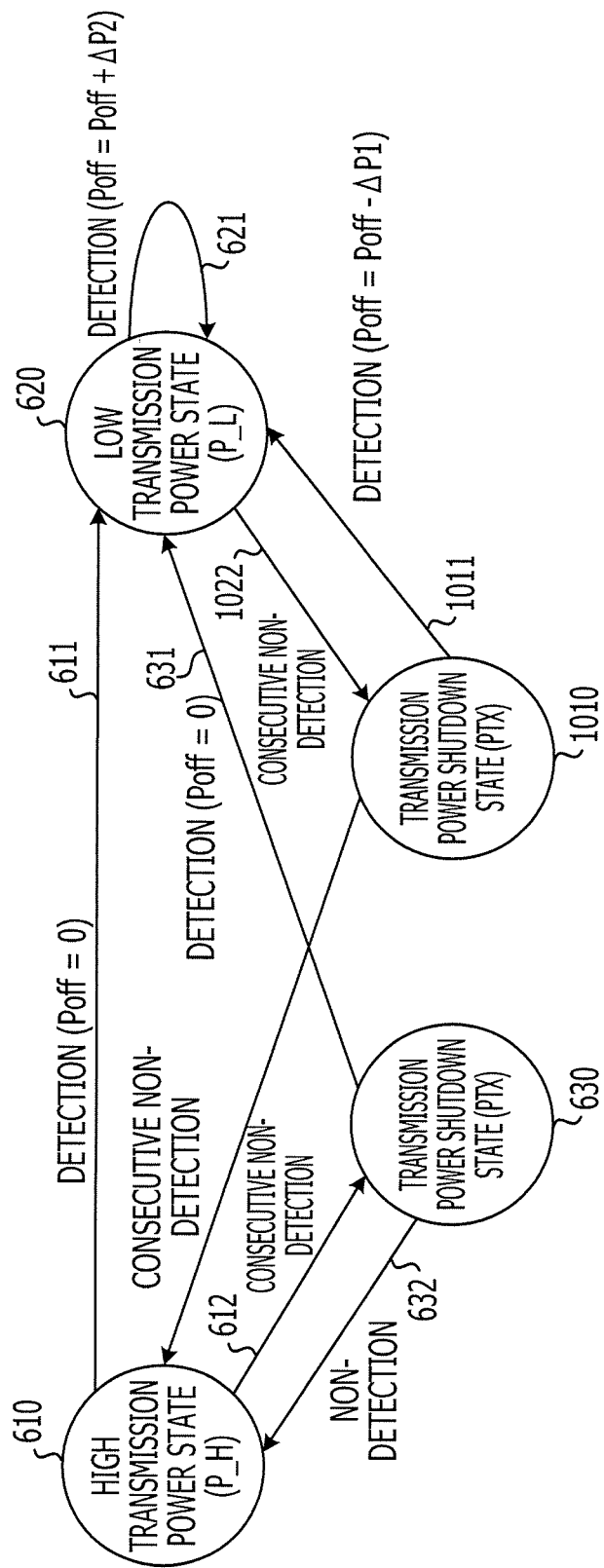
FIG. 11 is further another exemplary state transition dialogue of the femto base station.

FIG. 11 is further another exemplary state transition dialogue of the femto base station 330. It is to be noted that in FIG. 11, portions corresponding to those in FIG. 7 are given the same reference numerals, and a detailed description thereof will be omitted. As illustrated in FIG. 11, the femto base station 330 makes the transition among the high transmission power state 610, the low transmission power state 620, the transmission power shutdown states 630, and a transmission power shutdown state 1010.

The transmission power shutdown state 1010 corresponds to the above-described third state, similar to the transmission power shutdown state 630. The transmission power of the femto base station 330 in the low transmission power state 620 is set to P_L+Poff, where Poff denotes offset power.

When a victim UE has not consecutively been detected, namely, the consecutive non-detection has occurred for given times or more in the low transmission power state 620, the femto base station 330 makes the transition to the transmission power shutdown state 1010, as indicated by an arrow 1022.

In the case where a victim UE is detected in the transmission power shutdown state 1010, it is considered that the victim UE is unable to transmit a radio signal, because the transmission power does not sufficiently decrease in the low transmission power state 620. For this reason, the femto base station 330 decreases an offset power Poff by index difference ΔP1, as indicated by an arrow 1011 and, then returns to the low transmission power state 620. Accordingly, the femto base station 330 transmits a data signal to the femto UE 340 at sufficiently low transmission power, thereby making it possible to detect a victim UE more readily.

Meanwhile, in the case where a victim UE is detected in the low transmission power state 620, it is considered that the transmission power sufficiently decreases. Accordingly, the femto base station 330 may increase the offset power Poff by index difference ΔP2 up to a maximum offset power Poff_max that is an upper limit while maintaining the low transmission power state 620. This avoids the decrease in the throughput of the femto UE 340 by keeping the transmission power of the femto base station 330 from being excessively decreased.

(Operation of Femto Base Station)

Figure 12:
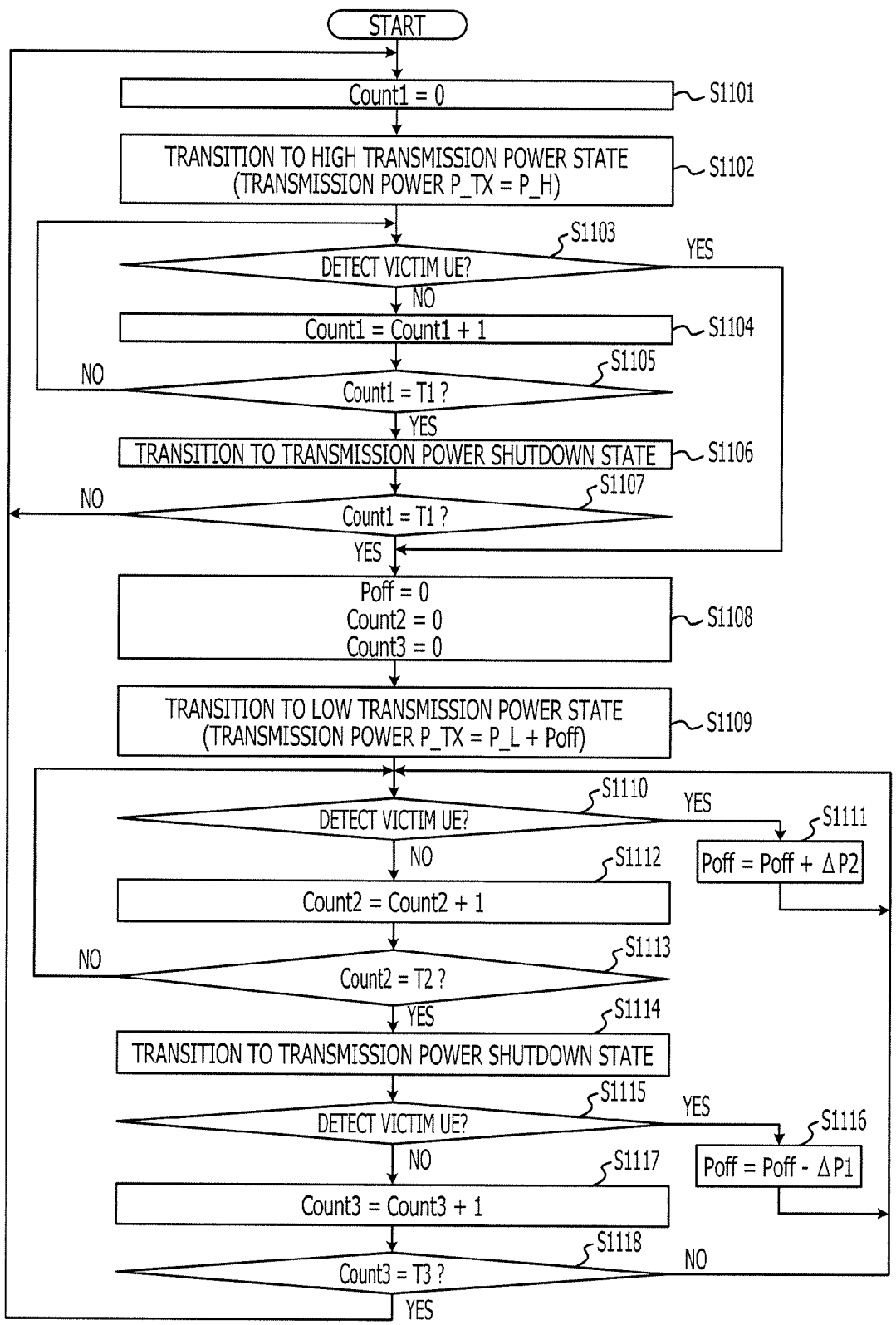
FIG. 12 is a flowchart of further another exemplary operation of the femto base station.

FIG. 12 is a flowchart of further another exemplary operation of the femto base station 330. The femto base station 330 according to the third embodiment makes the transition as illustrated in FIG. 11 by performing, for example, steps described below. In FIG. 12, a count value Count 2 indicates the number of times that the femto base station 330 consecutively fails to detect a victim UE in the low transmission power state 620, and a count value Count 3 indicates the number of times that the femto base station 330 consecutively fails to detect a victim UE in the transmission power shutdown state 1010. Steps S1101 to S1107 in FIG. 12 are the same as Steps S701 to S707 in FIG. 8, respectively.

If a victim UE has been detected at Step S1107 ("Yes" at Step S1107), the femto base station 330 sets all of an offset power Poff, a count value Count 2, and a count value Count 3 to 0 at Step S1108. At Step S1109, the femto base station 330 makes the transition to the low transmission power state 620. In other words, the femto base station 330 sets the transmission power P_TX to P_L+Poff. The initial value of the offset power Poff is, for example, 0 dB.

At Step S1110, the femto base station 330 determines whether to have detected a victim UE. If a victim UE has been detected ("Yes" at Step S1110), the femto base station 330 adds the index difference ΔP2 to the offset power Poff at Step S1111, and then, the process returns to Step S1110. Otherwise, if a victim UE has not been detected ("No" at Step S1110), the femto base station 330 increments the count value Count 2 by one at Step S1112.

At Step S1113, the femto base station 330 determines whether or not the count value Count 2 has reached a given value T2. In other words, the femto base station 330 determines whether to consecutively fail to detect a victim UE for T2 times in the low transmission power state 620. If the count value Count 2 has not reached the given value T2 ("No" at Step S1113), the process returns to Step S1110.

Otherwise, if the count value Count 2 has reached the given value T2 ("Yes" at Step S1113), the femto base station 330 makes the transition to the transmission power shutdown state 1010 at Step S1114. Then, at Step S1115, the femto base station 330 determines whether to have detected a victim UE in the transmission power shutdown state 1010 to which the femto base station 330 has made the transition at Step S1114.

If a victim UE has been detected at Step S1115 ("Yes" at Step S1115), the femto base station 330 decreases the offset power Poff by the index difference ΔP1 at Step S1116, and then, the process proceeds to Step S1110. If a victim UE has not been detected ("No" at Step S1115), the femto base station 330 determines that no actual victim UE is present. In this case, the femto base station 330 increments the count value Count 3 by one at Step S1117.

At Step S1118, the femto base station 330 determines whether or not the count value Count 3 has reached a given value T3. In other words, the femto base station 330 determines whether to have consecutively failed to detect a victim UE for T3 times in the transmission power shutdown state 1010. If the count value Count 3 has not reached the given value T3 ("No" at Step S1118), the process proceeds to Step S1110. Otherwise, if the count value Count 3 has reached the given value T3 ("Yes" at Step S1118), the process proceeds to Step S1101, and then, the femto base station 330 makes the transition to the high transmission power state 610.

As described above, the base station 110 according to the third embodiment is configured to make the transition to the third state (or the transmission power shutdown state 1010), when failing to detect the second mobile station 140 over a given period or longer in the second state (or the low transmission power state 620). This transition enables the second mobile station 140 to be detected, even when the second mobile station 140 is unable to be detected in the second state where the interference from the transmission power is low.

Meanwhile, when the second mobile station 140 has been detected in the third state (or the transmission power shutdown state 1010) to which the base station 110 has made the transition from the second state, the base station 110 decreases the second transmission power (P_L+Poff), and then, makes the transition to the second state. This transition enables the victim UE to be detected more readily by further decreasing the transmission power while the base station 110 is transmitting a data signal to the first mobile station 120.

Alternatively, the base station 110 may increase the second transmission power (P_L+Poff) while maintaining the second state, when detecting the second mobile station 140 in the second state. This makes it possible to avoid the decrease in the throughput of the first mobile station 120 by keeping the transmission power of the base station 110 from being excessively decreased.

With the above-described base station, communication system and communication method, the transmission power of the base station is decreased when the victim UE is detected, and in turn, the transmission power of the base station is temporally decreased when the victim UE has not been detected for a long time. In this way, it is possible to make the detection of the victim UE more readily and to reduce the interference with the victim UE.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a memory; and
a processor coupled to the memory and configured to:
transmit a first radio signal to a first mobile station;
detect a second mobile station based on a second radio signal transmitted from the second mobile station to another base station, the second radio signal being transmitted when the second mobile station receives a third radio signal transmitted from the another base station, the first radio signal being configured to interfere with the third radio signal, and
decrease transmission power of the first radio signal, on failing to detect the second mobile station based on the second radio signal transmitted from the second mobile station to the other base station over a first given period or longer.

2. The base station according to the claim 1, wherein
on detecting the second mobile station in a first state where a transmitter transmits the first radio signal at a first transmission power, the processor makes the transition to a second state where the transmitter transmits the first radio signal at a second transmission power being lower than the first transmission power, and
on failing to detect the second mobile station over the first given period or longer in the first state, the processor makes the transition to a third state where the transmitter stops transmitting a data signal of the first radio signal.

3. The base station according to the claim 2, wherein
on detecting the second mobile station in the third state, the processor makes the transition to the second state, and
on failing to detect the second mobile station in the third state, the processor makes the transition to the first state.

4. The base station according to the claim 2, wherein
on failing to detect the second mobile station over a second given period or longer in the second state, the processor makes the transition to the first state.

5. The base station according to the claim 2, wherein
the transmitter transmits the first radio signal except for the data signal in the third state.

6. The base station according to the claim 2, wherein
the transmitter transmits the data signal intermittently in the third state.

7. The base station according to the claim 2, wherein
the processor stops allocating a radio resource to the first mobile station in the third state.

8. The base station according to the claim 2, wherein
the processor detects the second mobile station repeatedly in the first state, and on failing to detect the second mobile station consecutively for given times, the processor controls the transmission power to be decreased.

9. The base station according to the claim 2, wherein
the processor controls the transmission power to be decreased in the first state at regular timings.

10. The base station according to the claim 9, wherein
an interval between the regular timings is coprime to a period during which the second mobile station performs the radio communication.

11. The base station according to the claim 2, wherein
on failing to detect the second mobile station over a third given period or longer in the second state, the processor makes the transition to the third state.

12. The base station according to the claim 11, wherein
on detecting the second mobile station in the third state to which the processor has made the transition from the second state, the processor decreases the second transmission power and makes the transition to the second state.

13. The base station according to the claim 11, wherein
on detecting the second mobile station in the second state, the processor increases the second transmission power.

14. The base station according to the claim 1, wherein
the second mobile station is unable to perform the radio communication with the base station.

15. The base station according to the claim 1, wherein
the processor detects the second mobile station, based on interference power included in a received radio signal.

16. The base station according to the claim 15, wherein
the processor detects the second mobile station, based on how many times measurement results acquired from a plurality of measurements of the interference power exceed a given threshold.

17. A communication system comprising:
a first mobile station;
a base station configured to transmit a first radio signal to the first mobile station; and
a second mobile station configured to transmit a second radio signal to another base station;
wherein the base station detects the second mobile station based on the second radio signal from the second mobile station, the second radio signal being transmitted when the second mobile station receives a third radio signal transmitted from the another base station, the first radio signal being configured to interfere with the third radio signal, and the base station decreases transmission power of the first radio signal, on failing to detect the second mobile station based on the second radio signal transmitted from the second mobile station to the other base station over a first given period or longer.

18. A communication method performed by a communication system including a first mobile station, a base station, and a second mobile station, the communication method comprising:
transmitting, by the base station, a first radio signal to the first mobile station;
detecting, by the base station, the second mobile station based on a second radio signal transmitted from the second mobile station to another base station, the second radio signal being transmitted when the second mobile station receives a third radio signal transmitted from the another base station, the first radio signal being configured to interfere with the third radio signal; and
decreasing, by the base station, transmission power of the first radio signal, on failing to detect the second mobile station based on the second radio signal transmitted from the second mobile station to the other base station over a first given period or longer.

19. The base station according to the claim 1, wherein the processor is configured, on failing to detect the second mobile station over the first given period or longer, to determine that the second mobile station is interfered by the base station.

* * * * *